United States Patent
Ng et al.

(10) Patent No.: US 7,508,545 B2
(45) Date of Patent: Mar. 24, 2009

(54) COLOR CONTOUR DETECTION AND CORRECTION

(75) Inventors: Yee Seung Ng, Fairport, NY (US);
Chung-Hui Kuo, Fairport, NY (US);
Dmitri Anatolyevich Gusev, Fairport, NY (US)

(73) Assignee: Eastman Kodak Company, Rochester, NJ (US)

( * ) Notice: Subject to any disclaimer, the term of this patent is extended or adjusted under 35 U.S.C. 154(b) by 627 days.

(21) Appl. No.: 10/951,013

(22) Filed: Sep. 27, 2004

(65) Prior Publication Data

US 2006/0072128 A1    Apr. 6, 2006

(51) Int. Cl.
*H04N 1/60* (2006.01)
*G03F 3/08* (2006.01)
*G03G 15/00* (2006.01)
*G06K 9/40* (2006.01)

(52) U.S. Cl. ........................ 358/1.9; 358/518; 358/504; 358/515; 358/520; 382/162; 382/167; 382/266; 399/72

(58) Field of Classification Search ................ 358/1.9, 358/2.1, 534, 500, 518, 521, 504, 515, 520, 358/537; 382/181, 232, 240, 248, 281–282, 382/199, 278, 162, 167, 165, 261, 263–265, 382/266; 715/513, 522; 235/462.03; 345/581, 345/593, 589; 399/72; 348/263, 190, 552, 348/745

See application file for complete search history.

(56) References Cited

U.S. PATENT DOCUMENTS

| | | | | |
|---|---|---|---|---|
| 5,055,923 A | * | 10/1991 | Kitagawa et al. | 358/534 |
| 5,475,428 A | * | 12/1995 | Hintz et al. | 348/263 |
| 5,598,482 A | * | 1/1997 | Balasubramanian et al. | 382/199 |
| 5,638,465 A | * | 6/1997 | Sano et al. | 382/281 |
| 5,896,489 A | * | 4/1999 | Wada | 358/1.2 |
| 7,039,248 B2 | * | 5/2006 | Hsuan | 382/240 |
| 7,068,851 B1 | * | 6/2006 | Berkner | 382/261 |
| 7,283,139 B1 | * | 10/2007 | Tanaka | 345/581 |
| 7,319,545 B2 | * | 1/2008 | Linder et al. | 358/1.9 |
| 2003/0121007 A1 | * | 6/2003 | Coleman | 715/522 |
| 2006/0050961 A1 | * | 3/2006 | Thiyagarajah | 382/181 |

FOREIGN PATENT DOCUMENTS

WO    WO 02/10860 A1    2/2002
WO    WO 02/14957 A1    2/2002

OTHER PUBLICATIONS

D. Rasmussen, W. Kress, M. Foyle, Y. Ng, D. Wolin and S. Korol, INCITS W1.1 Standardization for Evaluation of Perceptual Macro-Uniformity for Printing Systems, PICS pp. 96-101, 2003.
Color Technology for Electronic Imaging Devices, H. Kang, SPIE 1997.
Color Scanner Calibration via Neural Network, M. Vrhel and H. Trussell, ICASSP 1999.

* cited by examiner

*Primary Examiner*—Edward L Coles
*Assistant Examiner*—Charlotte M Baker

(57) ABSTRACT

A method of printing comprising the steps of detecting a contour in a first color space image, locating the contour, mapping the image into the second image space, and changing the mapping curve shape, changing the printer profile (e.g. changing the printer mapping function), editing the image, or other method to reduce or eliminate perceived contouring.

24 Claims, 5 Drawing Sheets

COLOR CONTOUR DETECTION AND CORRECTION

FIELD OF THE INVENTION

This invention is in the field of color printing, and is more specifically directed to managing the images in a color printing system.

BACKGROUND OF THE INVENTION

Color printing systems seek to reproduce a broad range of colors present in natural scenes or synthetic (i.e. computer-generated) images using typically only three or four colorants (pigments, dyes, etc.) which are inherently less than ideal in their absorption characteristics. The necessity of working with non-ideal colorants not only limits the range of colors that may be reproduced, but requires careful compensation or color correction to be applied so that the printed colors are the best possible match to those of the original artwork. Modifications of the image characteristics may be made to accommodate for the purpose of subjective improvements in the final appearance of the print. This color correction is usually done as part of the process of converting the red-green-blue signals (RGB) that measure the color of the original to cyan-magenta-yellow-black (CMYK) that controls the amounts of colorants used in a print. Efforts regarding such printing or printing systems have led to continuing developments to improve their versatility practicality, and efficiency.

DETAILED DESCRIPTION

Figure 1:
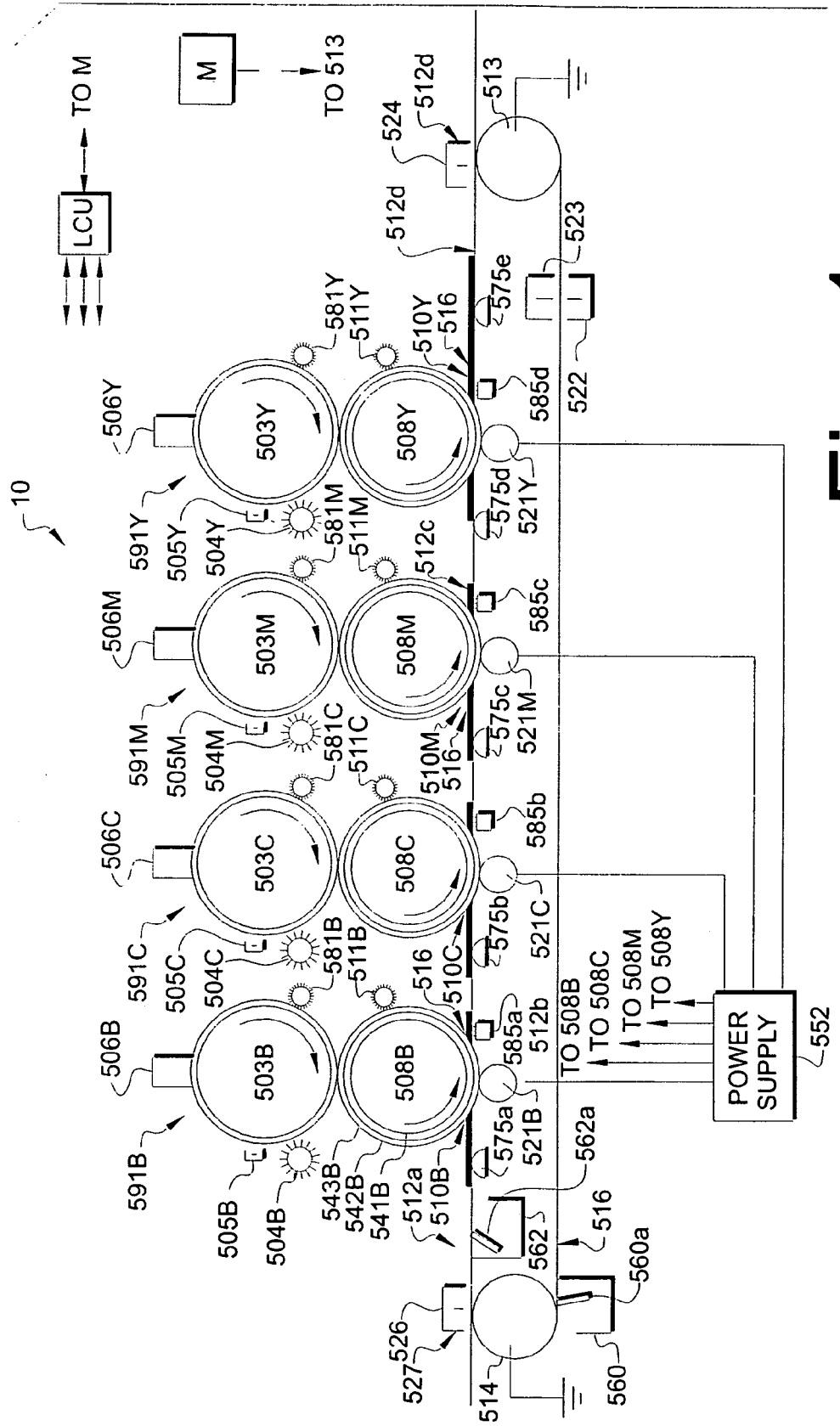
FIG. 1 is a schematic diagram of an electrographic marking or reproduction system in accordance with the present invention.

FIG. 1 illustrates an image forming reproduction apparatus or system according to an embodiment of the invention and designated generally by the numeral 10. The reproduction apparatus 10 is in the form of an electrophotographic reproduction apparatus and more particularly a color reproduction apparatus wherein color separation images are formed in each of four color modules (591B, 591C, 591M, 591Y) and transferred in register to a receiver member as a receiver member is moved through the apparatus while supported on a paper transport web (PTW) 516. More or less than four color modules may be utilized. For instance, the system may include a fifth color module or apparatus for example designated as F, thereby giving the print apparatus a CMYKF designation.

Each module is of similar construction except that as shown one paper transport web 516 which may be in the form of an endless belt operates with all the modules and the receiver member is transported by the PTW 516 from module to module. The elements in FIG. 1 that are similar from module to module have similar reference numerals with a suffix of B, C, M and Y referring to the color module to which it is associated; i.e., black, cyan, magenta and yellow, respectively. Four receiver members or sheets 512a, b, c and d are shown simultaneously receiving images from the different modules, it being understood as noted above that each receiver member may receive one color image from each module and that in this example up to four color images can be received by each receiver member. The movement of the receiver member with the PTW 516 is such that each color image transferred to the receiver member at the transfer nip of each module is a transfer that is registered with the previous color transfer so that a four-color image formed on the receiver member has the colors in registered superposed relationship on the receiver member. The receiver members are then serially detacked from the PTW and sent to a fusing station (not shown) to fuse or fix the dry toner images to the receiver member. The PTW is reconditioned for reuse by providing charge to both surfaces using, for example, opposed corona chargers 522, 523 which neutralize charge on the two surfaces of the PTW.

Each color module includes a primary image-forming member (PIFM), for example a rotating drum 503B, C, M and Y, respectively. The drums rotate in the directions shown by the arrows and about their respective axes. Each PIFM 503B, C, M and Y has a photoconductive surface, upon which a pigmented marking particle image, or a series of different color marking particle images, is formed. In order to form images, the outer surface of the PIFM is uniformly charged by a primary charger such as a corona charging device 505 B, C, M and Y, respectively or other suitable charger such as roller chargers, brush chargers, etc. The uniformly charged surface is exposed by suitable exposure means, such as for example a laser 506 B, C, M and Y, respectively or more preferably an LED or other electro-optical exposure device or even an optical exposure device to selectively alter the charge on the surface of the PIFM to create an electrostatic latent image corresponding to an image to be reproduced. The electrostatic image is developed by application of pigmented charged marking particles to the latent image bearing photoconductive drum by a development station 581 B, C, M and Y, respectively. The development station has a particular color of pigmented toner marking particles associated respectively therewith. Thus, each module creates a series of different color marking particle images on the respective photoconductive drum. In lieu of a photoconductive drum which is preferred, a photoconductive belt may be used.

Electrophotographic recording is described herein for exemplary purposes only. For example, there may be used electrographic recording of each primary color image using stylus recorders or other known recording methods for recording a toner image on a dielectric member that is to be transferred electrostatically as described herein. Broadly, the primary image is formed using electrostatography. In addition, the present invention applies to other printing systems as well, such as inkjet, thermal printing, etc.

Each marking particle image formed on a respective PIFM is transferred electrostatically to an outer surface of a respective secondary or intermediate image transfer member (ITM), for example, an intermediate transfer drum 508 B, C, M and Y, respectively. The PIFMs are each caused to rotate about their respective axes by frictional engagement with a respective ITM. The arrows in the ITMs indicate the directions of rotations. After transfer any residual the toner image is cleaned from the surface of the photoconductive drum by a suitable cleaning device 504 B, C, M and Y, respectively to prepare the surface for reuse for forming subsequent toner images. The intermediate transfer drum or ITM preferably includes a metallic (such as aluminum) conductive core 541

B, C, M and Y, respectively and a compliant blanket layer 543 B, C, M and Y, respectively. The cores 541 C, M and Y and the blanket layers 543 C, M and Y are shown but not identified in FIG. 1 but correspond to similar structure shown and identified for module 591B. The compliant layer is formed of an elastomer such as polyurethane or other materials well noted in the published literature. The elastomer has been doped with sufficient conductive material (such as antistatic particles, ionic conducting materials, or electrically conducting dopants) to have a relatively low resistivity. With such a relatively conductive intermediate image transfer member drum, transfer of the single color marking particle images to the surface of the ITM can be accomplished with a relatively narrow nip width and a relatively modest potential of suitable polarity applied by a constant voltage potential source (not shown). Different levels of constant voltage can be provided to the different ITMs so that the constant voltage on one ITM differs from that of another ITM in the apparatus.

A single color marking particle image respectively formed on the surface 542B (others not identified) of each intermediate image transfer member drum, is transferred to a toner image receiving surface of a receiver member, which is fed into a nip 510B C, M, and Y between the intermediate image transfer member drum and a transfer backing roller (TBR) 521B, C, M and Y, respectively, that is suitably electrically biased by a constant current power supply 552 to induce the charged toner particle image to electrostatically transfer to a receiver sheet. Each TBR is provided with a respective constant current by power supply 552. The transfer backing roller or TBR preferably includes a metallic (such as aluminum) conductive core and a compliant blanket layer. Although a resistive blanket is preferred, the TBR may be a conductive roller made of aluminum or other metal. The receiver member is fed from a suitable receiver member supply (not shown) and is suitably "tacked" to the PTW 516 and moves serially into each of the nips 510B, C, M and Y where it receives the respective marking particle image in suitable registered relationship to form a composite multicolor image. As is well known, the colored pigments can overlie one another to form areas of colors different from that of the pigments. The receiver member exits the last nip and is transported by a suitable transport mechanism (not shown) to a fuser where the marking particle image is fixed to the receiver member by application of heat and/or pressure and, preferably both. A detack charger 524 may be provided to deposit a neutralizing charge on the receiver member to facilitate separation of the receiver member from the PTW 516. The receiver member with the fixed marking particle image is then transported to a remote location for operator retrieval. The respective ITMs are each cleaned by a respective cleaning device 511B, C, M and Y to prepare it for reuse. Although the ITM is preferred to be a drum, a belt may be used instead as an ITM.

Appropriate sensors such as mechanical, electrical, or optical sensors are utilized in the reproduction apparatus 10' to provide control signals for the apparatus. Such sensors are located along the receiver member travel path between the receiver member supply through the various nips to the fuser. Further sensors may be associated with the primary image forming member photoconductive drum, the intermediate image transfer member drum, the transfer backing member, and various image processing stations. As such, the sensors detect the location of a receiver member in its travel path, and the position of the primary image forming member photoconductive drum in relation to the image forming processing stations, and respectively produce appropriate signals indicative thereof. Such signals are fed as input information to a logic and control unit LCU including a microprocessor, for example. Based on such signals and a suitable program for the microprocessor, the control unit LCU produces signals to control the timing operation of the various electrostatographic process stations for carrying out the reproduction process and to control drive by motor M of the various drums and belts. The production of a program for a number of commercially available microprocessors, which are suitable for use with the invention, is a conventional skill well understood in the art. The particular details of any such program would, of course, depend on the architecture of the designated microprocessor.

The receiver members utilized with the reproduction apparatus 10 can vary substantially. For example, they can be thin or thick paper stock (coated or uncoated) or transparency stock. As the thickness and/or resistivity of the receiver member stock varies, the resulting change in impedance affects the electric field used in the nips 510B, C, M, Y to urge transfer of the marking particles to the receiver members. Moreover, a variation in relative humidity will vary the conductivity of a paper receiver member, which also affects the impedance and hence changes the transfer field. To overcome these problems, the paper transport belt preferably includes certain characteristics.

The endless belt or web (PTW) 516 is preferably comprised of a material having a bulk electrical resistivity. This bulk resistivity is the resistivity of at least one layer if the belt is a multilayer article. The web material may be of any of a variety of flexible materials such as a fluorinated copolymer (such as polyvinylidene fluoride), polycarbonate, polyurethane, polyethylene terephthalate, polyimides (such as Kapton. TM.), polyethylene napthoate, or silicone rubber. Whichever material that is used, such web material may contain an additive, such as an anti-stat (e.g. metal salts) or small conductive particles (e.g. carbon), to impart the desired resistivity for the web. When materials with high resistivity are used additional corona charger(s) may be needed to discharge any residual charge remaining on the web once the receiver member has been removed. The belt may have an additional conducting layer beneath the resistive layer which is electrically biased to urge marking particle image transfer. Also acceptable is to have an arrangement without the conducting layer and instead apply the transfer bias through either one or more of the support rollers or with a corona charger. It is also envisioned that the invention applies to an electrostatographic color machine wherein a generally continuous paper web receiver is utilized and the need for a separate paper transport web is not required. Such continuous webs are usually supplied from a roll of paper that is supported to allow unwinding of the paper from the roll as the paper passes as a generally continuous sheet through the apparatus.

In feeding a receiver member onto PTW 516, charge may be provided on the receiver member by charger 526 to electrostatically attract the receiver member and "tack" it to the PTW 516. A blade 527 associated with the charger 526 may be provided to press the receiver member onto the belt and remove any air entrained between the receiver member and the belt.

A receiver member may be engaged at times in more than one image transfer nip and preferably is not in the fuser nip and an image transfer nip simultaneously. The path of the receiver member for serially receiving in transfer the various different color images is generally straight facilitating use with receiver members of different thicknesses.

The endless paper transport web (PTW) 516 is entrained about a plurality of support members. For example, as shown in FIG. 1, the plurality of support members are rollers 513, 514 with preferably roller 513 being driven as shown by motor M to drive the PTW (of course, other support members such as skis or bars would be suitable for use with this invention). Drive to the PTW can frictionally drive the ITMs to rotate the ITMs which in turn causes the PIFMs to be rotated, or additional drives may be provided. The process speed is determined by the velocity of the PTW.

Alternatively, direct transfer of each image may be made directly from respective photoconductive drums to the receiver sheet as the receiver sheet serially advances through the transfer stations while supported by the paper transport web without ITMs. The respective toned color separation images are transferred in registered relationship to a receiver member as the receiver member serially travels or advances from module to module receiving in transfer at each transfer nip a respective toner color separation image. Either way, different receiver sheets may be located in different nips simultaneously and at times one receiver sheet may be located in two adjacent nips simultaneously, it being appreciated that the timing of image creation and respective transfers to the receiver sheet is such that proper transfer of images are made so that respective images are transferred in register and as expected.

Other approaches to electrographic printing process control may be utilized, such as those described in international publication number WO 02/10860a1, and international publication number WO 02/14957 A1, both commonly assigned herewith and incorporated herein by reference.

Figure 2:
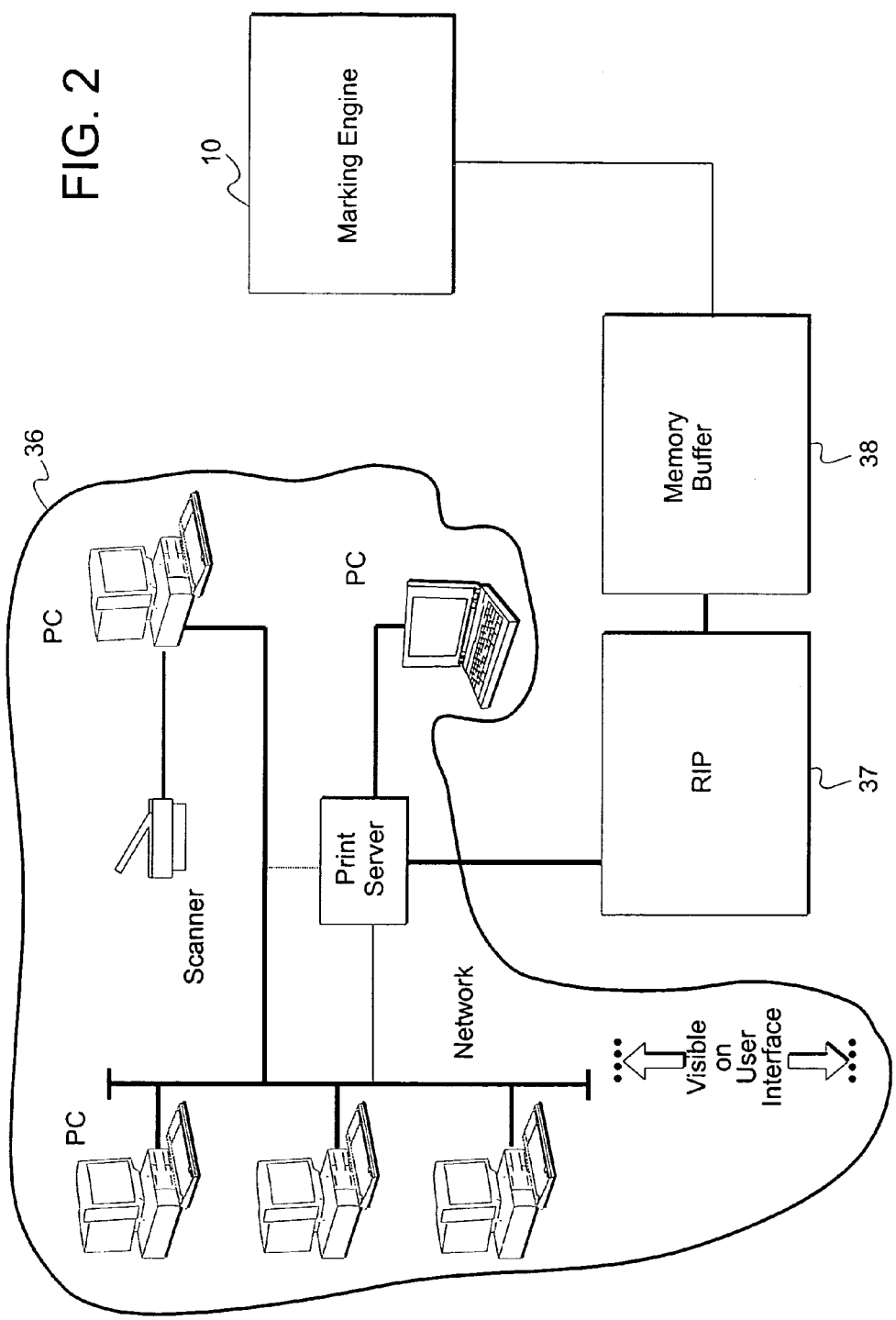
FIG. 2 is a schematic diagram of an electrographic marking or reproduction system in accordance with the present invention.

Referring to FIG. 2, image data to be printed is provided by an image data source 36, which is a device that can provide digital data defining a version of the image. Such types of devices are numerous and include computer or microcontroller, computer workstation, scanner, digital camera, etc. Multiple devices may be interconnected on a network. These image data sources are at the front end and generally include an application program that is used to create or find an image to output. The application program sends the image to a device driver, which serves as an interface between the client and the marking device. The device driver then encodes the image in a format that serves to describe what image is to be generated on a page. For instance, a suitable format is page description language ("PDL"). The device driver sends the encoded image to the marking device. This data represents the location, color, and intensity of each pixel that is exposed. Signals from data source 36, in combination with control signals from LCU (FIG. 1) are provided to a raster image processor (RIP) 37 for rasterization.

In general, the major roles of the RIP 37 are to: receive job information from the server; parse the header from the print job and determine the printing and finishing requirements of the job; analyze the PDL (page description language) to reflect any job or page requirements that were not stated in the header; resolve any conflicts between the requirements of the job and the marking engine configuration (i.e., RIP time mismatch resolution); keep accounting record and error logs and provide this information to any subsystem, upon request; communicate image transfer requirements to the marking engine; translate the data from PDL (page description language) to raster for printing; and support diagnostics communication between user applications. The RIP accepts a print job in the form of a page description language (PDL) such as postscript, PDF or PCL and converts it into raster, or grid of lines or form that the marking engine can accept. The PDL file received at the RIP describes the layout of the document as it was created on the host computer used by the customer. This conversion process is also called rasterization as well as ripping. The RIP makes the decision on how to process the document based on what PDL the document is described in. It reaches this decision by looking at the beginning data of the document, or document header.

Raster image processing or ripping begins with a page description generated by the computer application used to produce the desired image. The raster image processor interprets this page description into a display list of objects. This display list contains a descriptor for each text and non-text object to be printed; in the case of text, the descriptor specifies each text character, its font, and its location on the page. For example, the contents of a word processing document with styled text is translated by the RIP into serial printer instructions that include, for the example of a binary black printer, a bit for each pixel location indicating whether that pixel is to be black or white. Binary print means an image is converted to a digital array of pixels, each pixel having a value assigned to it, and wherein the digital value of every pixel is represented by only two possible numbers, either a one or a zero. The digital image in such a case is known as a binary image. Multi-bit images, alternatively, are represented by a digital array of pixels, wherein the pixels have assigned values of more than two number possibilities. The RIP renders the display list into a "contone" (continuous tone) byte map for the page to be printed. This contone byte map represents each pixel location on the page to be printed by a density level (typically eight bits, or one byte, for a byte map rendering) for each color to be printed. Black text is generally represented by a full density value (255, for an eight bit rendering) for each pixel within the character. The byte map typically contains more information than can be used by the printer. Finally, the RIP rasterizes the byte map into a bit map for use by the printer. Halftone densities are formed by the application of a halftone "screen" to the byte map, especially in the case of image objects to be printed. Pre-press adjustments can include the selection of the particular halftone screens to be applied, for example to adjust the contrast of the resulting image.

Electrographic printers with gray scale printheads are also known, as described in international publication number WO 01/89194 a2, incorporated herein by reference. The ripping algorithm groups adjacent pixels into sets of adjacent cells, each cell corresponding to a halftone dot of the image to be printed. The gray tones are printed by increasing the level of exposure of each pixel in the cell, by increasing the duration by way of which a corresponding led in the printhead is kept on, and by "growing" the exposure into adjacent pixels within the cell.

Once the document has been ripped by one of the interpreters, the raster data goes to a page buffer memory (PBM) 38 or cache via a data bus. The PBM eventually sends the ripped print job information to the marking engine 10. The PBM functionally replaces recirculating feeders on optical copiers. This means that images are not mechanically rescanned within jobs that require rescanning, but rather, images are electronically retrieved from the PBM to replace the rescan process. The PBM accepts digital image input and stores it for a limited time so it can be retrieved and printed to complete the job as needed. The PBM consists of memory for storing digital image input received from the rip. Once the images are in memory, they can be repeatedly read from memory and output to the print engine. The amount of memory required to store a given number of images can be reduced by compressing the images; therefore, the images may be compressed prior to memory storage, then decompressed while being read from memory.

The digital print system quantizes images both spatially and tonally. A two dimensional image is represented by an array of discrete picture elements or pixels, and the color of each pixel is in turn represented by a plurality of discrete tone or shade values (usually an integer between 0 and 255) which correspond to the color components of the pixel: either a set of red, green and blue (RGB) values, or a set of yellow, magenta, cyan, and black (YMCK) values that will be used to control the amount of ink used by a printer to best approximate the measured color.

Color patches from the printer are measured to determine their color characteristics. A color may be characterized by its lightness, saturation, and hue. One commonly used color measurement system is the CIELAB L*a*b* system, wherein the "L" represents the lightness of the color, the "a" represents the location of the color on a spectrum from red to green, and the "b" represents the location of the color on a spectrum from yellow to blue. The "a" and "b" taken together represent the saturation and hue of the color. the L*a*b* measurement system provides a simple means for calculating the "difference" or "similarity" of two different colors in absolute terms. While this absolute value does not reflect in what manner two colors differ, it does reflect how far apart they are in color appearance.

When different color input descriptions (RGB, CMYK, L*a*b*) are used and mapped through a color management system and halftone screening, color density contours can occur when color interpretation limitations coupled with limited color levels available and EP process variation occurs. In cases like limited level printing (1200×2400 dpi binary), wider gamut dynamic range covered (like belt fused images), 5th color printing when there are potential of 4/5 colors being used at the same time (so sensitivity to process drift between colors occur which can cause density reversal problem), color contouring can occur. Color contouring occurs when perceived local color change exceeds a threshold such that observers perceive unnatural color discontinuity. It is therefore the color correlation within neighboring pixels that determines the existence of color contouring artifacts. The problem exists in printing systems if there is insufficient color resolution. Depending how a print system deploys it's color mapping algorithm, color contouring artifacts might occur in different locations within the printers color gamut. Also when new substrate are used for printing system by customer and color profile needs to be built, sometimes color contouring occurs.

Because reported RGB values are device dependent and visually nonuniform in terms of color difference, it is beneficial to transform to a visually more uniform color space before analyzing color contouring. For instance, CIEΔE2000 is a match with human perception for color difference measurement.

Figure 3:
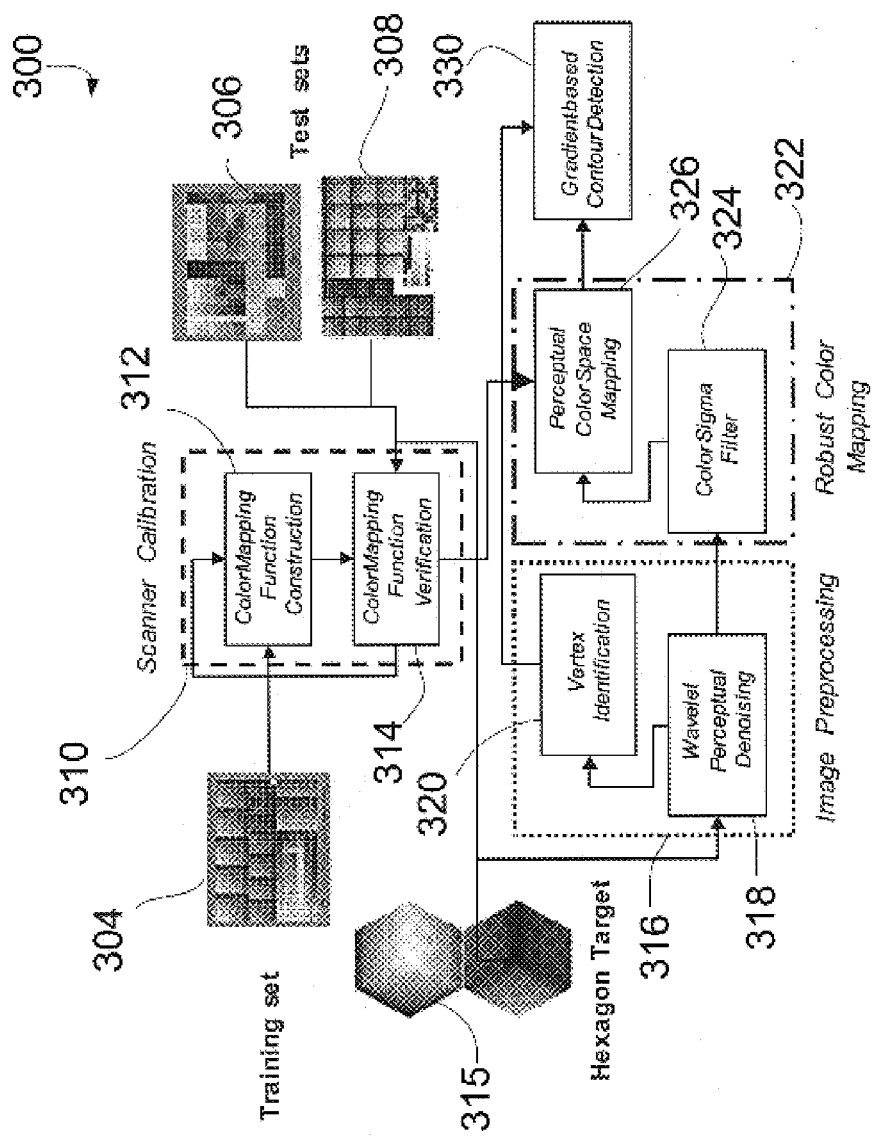
FIG. 3 illustrates a flow chart for detecting color contours in accordance with the present invention.

FIG. 3 illustrates a flowchart 300 for color contour analysis utilizing a scanner that is not necessarily calorimetric. In a first functional block 310, the scanner is calibrated. A first step 312 entails calibration by scanning a training set image on the scanner and performing a color mapping function construction (from scanner's RGB sensed data of a reflection print to more perceptually uniform color space such as L*a*b*). An example of such a calibration training set (input test charts) and calibration test sets is a W1.1 Macro CMYK V9 test target is used to construct $M_s(r, g, b)$, and W1.1 Macro Test V3 and IT8.73 test targets may be used to verify the scanner generalization capability w.r.t. mapping accuracy. Reference is hereby made to D. Rasmussen, W. Kress, M. Foyle, Y. Ng, D. Wolin and S. Korol, INCITS W1.1 Standardization for Evaluation of Perceptual Macro-Uniformity for Printing Systems, PICS pp. 96-101, 2003, which is hereby incorporated herein by reference. A compromise between the mapping accuracy and continuity is achieved via the degree of the polynomials, the number of neurons, and the width of the selected radial basis function (RBF). A RBF approach is better suited for uniform and dense sampling in the color space, which is not always satisfied in a designed training set. Color mapping function verification is performed in a step 314. It is suggested to check the smoothness of $M_s(r, g, b)$ by applying it to a scanned descreened hexagon image, which should produce no spurious contouring artifact. Mathematical regression techniques may be adopted to construct $M_s(r, g, b)$ because the physical information regarding the spectral responsivities of the scanner light sources is usually available. Multidimensional polynomial regression and feed-forward neural network are two acceptable techniques. The smoothness constraint is explicitly enforced in the polynomial regression by limiting to a lower degree polynomial, but it can be implicitly applied via limiting the number of hidden neurons. A degree-two three-dimensional polynomial with all cross terms is a function form that can achieve color mapping accuracy, so it is chosen as the regression model based on the Occam's Razor principle. A feed-forward neural network with one hidden neuron layer and the Conjugate Gradient training method is selected and compared with the polynomial Regression technique. Reference is hereby made to "Color Technology for Electronic Imaging Devices", H. Kang, SPIE 1997 and "Color Scanner Calibration via Neural Network", M. Vrhel and H. Trussell, ICASSP 1999, which are hereby incorporated herein by reference. For mapping function verification, one increases the functional complexity until the maximal mapping error in the training/test sets reaches a minimum. Mapping functionals are then adjusted to have similar mapping errors (fixed mapping accuracy), and then select the most smooth mapping function (best mapping continuity). Scanner calibration performed in block 310 presumably need to be done only once since the colorant/engine/paper is specified and calibrated with it.

Figure 5:
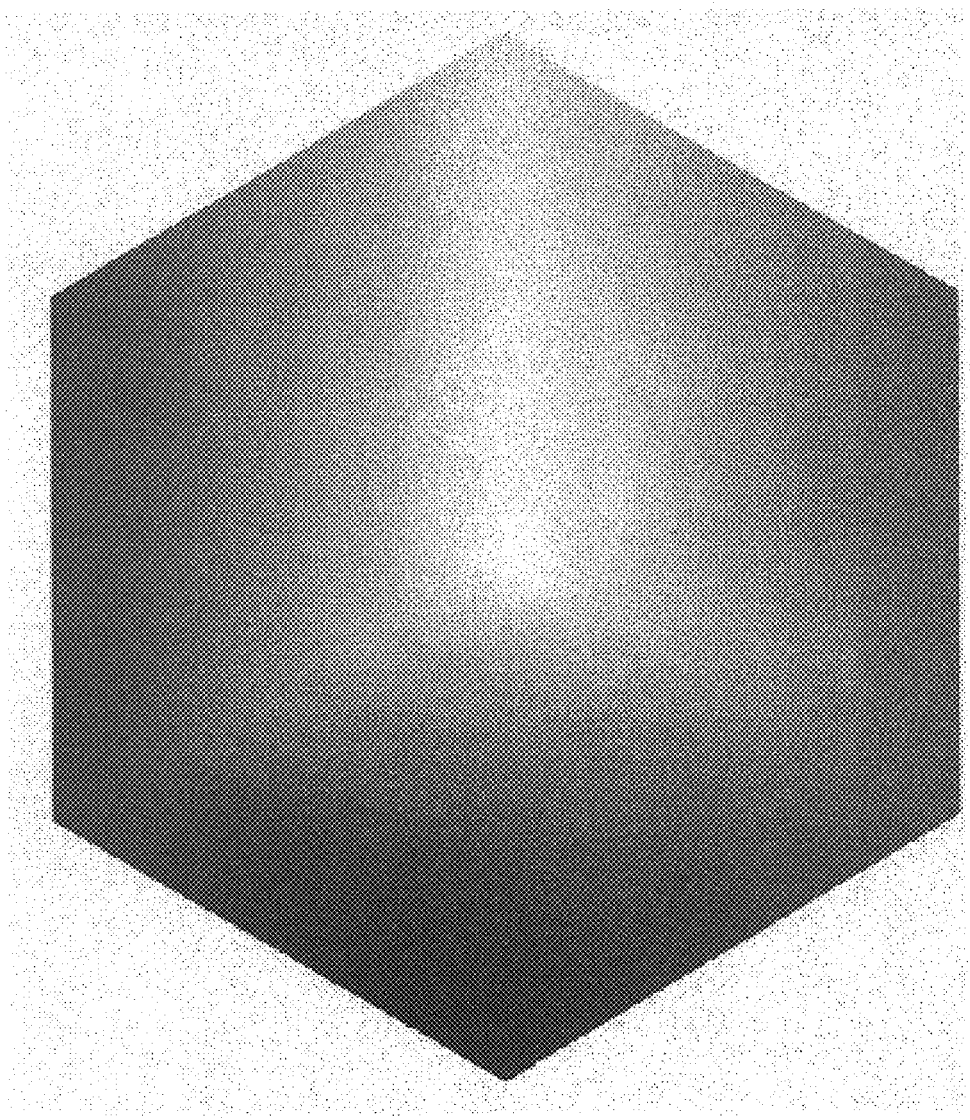
FIG. 5 is an illustration of a hexagon test target in accordance with the present invention.

Image preprocessing is performed in a functional block 316 and is comprised of two processes, image descreening or wavelet perceptual denoising 318 and vertex identification 320. A test chart that represents a color hexagon (or other acceptable test chart that cuts across certain color sectors of interest) is used for these processes. A color hexagon test target is shown in FIG. 5 herein. Other shapes, such as a square, rectangle, diamond, etc. may be used instead of a hexagon.

Image descreening techniques typically keep all of image information except screen (on the reflection print). Descreening scanned images for color contouring analysis in the present invention also eliminates other micro image artifacts such as density granularity based on human perception. Assuming a scan resolution of r dpi and a viewing distance of d meters, because color contouring belongs to the macro image quality domain. The following equation is used to transform the spatial frequency from cycle/m to cycle/degree, which is used to represent a typical contrast sensitivity function of human beings:

$$f=2rd\tan(0.5°)/0.0254$$

Based on the common practice of scanning an image at three times the screen frequency to avoid possible Moire pattern of interference noises, the highest spatial frequency captured in the scanned image is about 52 cycle/degree assuming a viewing distance of 25 cm and 600 dpi scanning resolution. The contrast sensitivity function peaks at approximately 5 cycl/degree and decays exponentially toward high frequencies. A two level discrete wavelet transform uses the Daubechies 9/7 biorthogonal filterbank (i.e. the default filterbank in JPEG2000). The approximation image on the level two wavelet transform contains signals with spatial frequencies up to 13 cycle/degree. It can be assumed that signals with frequencies higher than that, including screen, do not contribute to perceived color contouring artifacts. A perceptually denoised image via retrieving the base image containing signal frequencies up to 13 cycle/degree is obtained. Since human contrast sensitivity function peaks around 5-8 cycle/deg and exponentially decays toward high angular frequency domain, the denoised image contains the important sharpness information for the human observer, but has reduced effect due to the higher frequency screen on the image. Descreening and high frequency noise elimination can be achieved by only extracting this subband image for future color contouring analysis.

Once color contouring is recognized, the device color space color locations, such as CMYK, CMYKF, RGB or other, etc., device color space color locations where the contouring artifacts occur is determined. This can be accomplished through recognition of the relative location of the color contouring artifact within a predefined target, such as a hexagon by locating the vertices and center point. Because the colorant combination of the hexagon is known, the location in the device color space where contouring artifacts appear can be accurately pinpointed despite mapping errors caused by $M_s(r, g, b)$.

Vertex identification 320 therefore translates from the location in the spatial domain to a specific device color combination based on the predefined target (e.g. hexagon). The vertex identification step uses a progressive refinement method to identify the vertex of the hexagon. First, the assumption is made that the background of the scanned image is primarily paper, which allows estimation of the extent of two hexagon images horizontally and vertically. This can be accomplished even if the print is skewed in the scanner during scanning process. Since the digital file that defines the hexagon image is known, the physical location of the scanner image to the intended device color output data location can be linked. Vertex location is refined using a progressive vertex searching algorithm which assumes all pixels near an approximated vertex can be clustered into two groups in a color space and therefore boundary pixels can be located. Since the curvature along the boundary of the target reaches the maximum at the vertices, location of the vertices can be refined by fitting the boundary with a cubic spline curve and finding the maximal curvature point k using the following:

$$\kappa = \frac{x'y'' - y'x''}{(x'^2 + y'^2)^{3/2}}$$

With vertex identification and location established, robust color mapping is performed in a functional block 322. Color contour can be characterized as the perceived color change within a small region exceeding a threshold. As a result, observers perceive color discontinuity at that location. In other words, color contouring artifacts can be attributed to color gradient in the special domain. Computing color gradient is problematic, however, because the descreened image still contains noise from the printing process and differentiation is inherently a high-pass filter. Hence the signal from the actual color contour will be covered by enhanced noise after simply computing color gradient.

In a step 324, a sigma filter is utilized to preprocess the image, which helps to alleviate this problem. This type of preprocessing smoothes out of the printing noise and preserves color contour. A sigma filter first slides a small window across the image and only applies the filter at the pixels which are identified as being in the same cluster as the center pixel. As a result, the smoothing effect doesn't run across the contour and only applies to pixels of which location in a color space are close to one another. The filtered image therefore becomes piecewise smooth with edges that are preserved.

In other words, the purpose of the sigma filter is to reduce the printing/scanning high frequency noise and preserve the existing color contours detectable by human observers, so as to facilitate the gradient-based contour detection algorithm described hereinafter.

A perceptual color mapping function is then performed in a step 326. In this step the sigma filtered RGB scanner image values are mapped into L*a*b* color space values based on a quadratic polynomial regression function as described hereinbefore to achieve a device independent, perceptually more uniform analysis.

Assume $M_f$ is the mapping function and $I_{sf}(R, G, B)$ is the sigma filtered descreened image, a gradient operator is applied in a step 330 on the transformed image $\hat{I}_{sf}(L, a, b) = M_f(I_{sf}(R, G, B))$, where the forward, backward and central difference are adopted according to various boundary conditions. The vector norm is adopted to represent the magnitude of the color gradient, $|\nabla \text{Color}|$. After applying a Gaussian low pass filter to reduce the amount of erroneous peaks of color gradient the location of the color contouring artifacts can be identified as the pixels with where $|\nabla \text{Color}|$ exceeds a predetermined threshold. The gradient can be calculated as follows:

$$\Delta E = \sqrt{(L_1^* - L_2^*)^2 + (a_1^* - a_2^*)^2 + (b_1^* - b_2^*)^2}$$

The gradient-based contour detection block takes the L*a*b* data as well as the vertex position data from the vertex identification function to compute the magnitude of color gradient of the scanned data. A certain perceptually important threshold can be set (in this case $\Delta E=1$), such that when the color gradient exceeds the threshold, the location where the gradient exceeds the threshold is identified.

It is to be noted that the training set 304 is used to create a color mapping function for the calibration device (such as an external RGB flatbed scanner or in-line scanner) that maps a particular printing process (engine process/paper/colorants) to a more uniform color space for human perception (such as CIE$\Delta$E2000, CIE$\Delta$E76 etc.). Test set 306, 308 are used to confirm and fine tune that color mapping function for use in step 322. Reference is hereby made to hexagon test target 315 used for system control and maintenance (for example environmental change and process drift may have caused large enough change that need to rebuild the color profile) and may also be used to confirm and or adjust color profile built with other color profiling methods with particular halftone screens involved for the engine/paper/colorants combination in question. The color target does not have to be hexagonal in shape and may be other shapes. What is required is a known/desirable response in a particular geometric location on the test target which later can be used to indicated the color separation's location. In this particular case, the color variation on the hexagon test target is smoothly changing. If it is not smoothly changing, present invention detects where contours are (based on the uniform color space with a customer adjustable threshold) in geometric location and is mapped to the color separation (CMYK) space. A profile editor can then be used to reduce or eliminate the contours.

Figure 4:
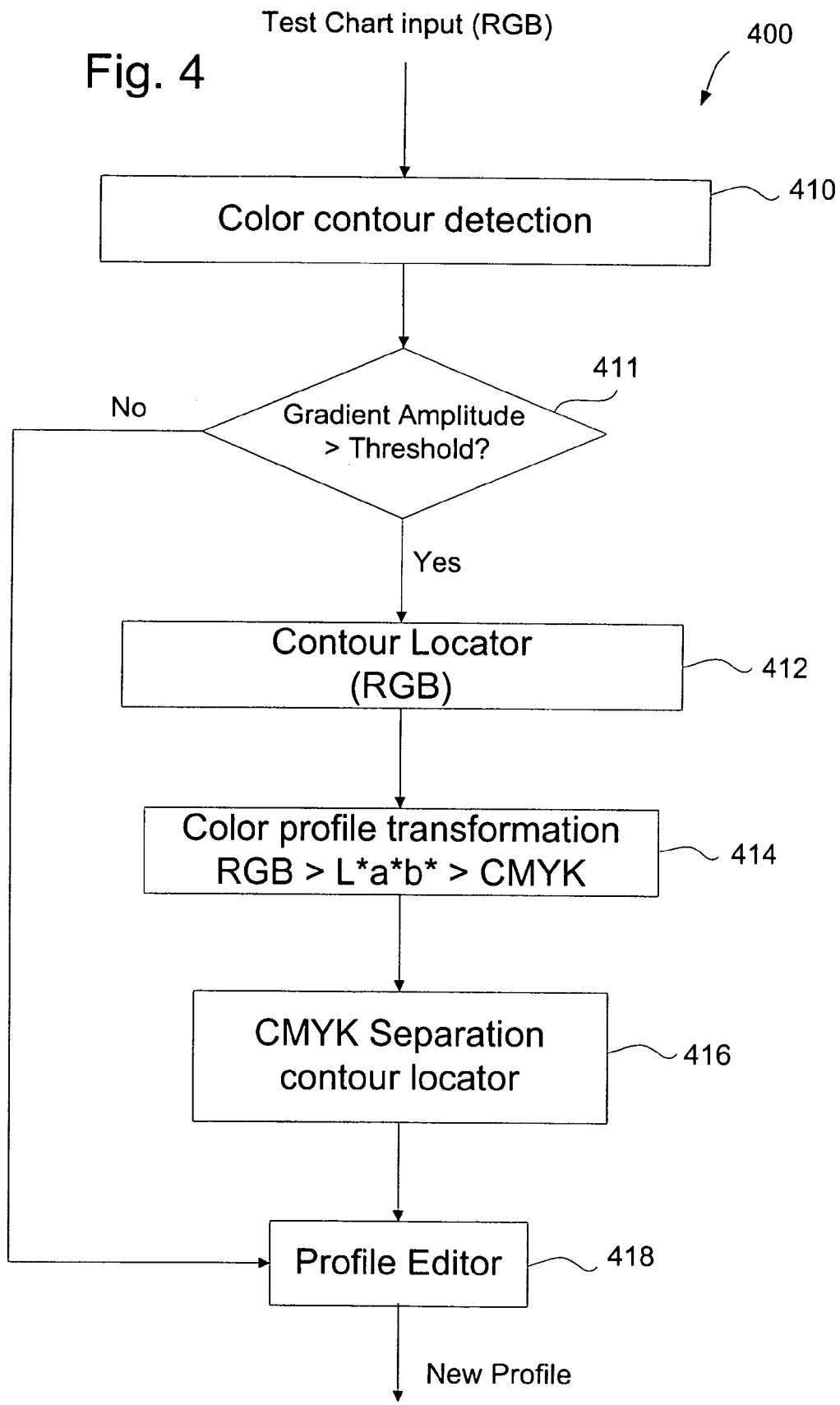
FIG. 4 illustrates a flow chart for operating a printer in accordance with the present invention.

Referring to FIG. 4, a procedure 400 for operating a printer comprises performing color contour detection in a step 410. This step can be performed as described in flow chart 300 of FIG. 3. Once detected, query is made in a step 411 whether the contour is greater than a threshold. If yes, then the color contours are located in a step 412 as previously described. The physical location of the color gradient and it's amplitude can be mapped back to the original digital file code value (RGB input data that is used to create the hexagon test chart) where this contouring occurs. In a step 414, the color management system is used to transform the original RGB data into device printing space (such as CMYK) and wherein the location on the CMYK space that the contour occurs is identified. Once the problem location is identified, a profile editing function in a step 418 is utilized to change the region of interest so as to reduce or eliminate the aforementioned contouring. This may entail changing the mapping curve shape, changing the printer profile (e.g. changing the printer mapping function), editing the image, or other method to reduce or eliminate perceived contouring.

FIG. 5 is an example of a hexagon test chart for detecting contours in accordance with the present invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The invention claimed is:

1. A method of printing with a printer comprising the steps of:
   printing a first color space image using a test target that has a smoothly changing color;
   detecting a perceived color discontinuity in said first color space image;
   locating said perceived color discontinuity in said first color space image; and
   mapping said first color space image into a second image space.

2. A method in accordance with claim 1, wherein said first color space image is a hexagon.

3. A method in accordance with claim 1, wherein the detecting step comprises determining whether the perceived color discontinuity exceeds a threshold gradient.

4. A method in accordance with claim 1, further comprising applying wavelet perceptual denoising to the image before the locating step.

5. A method in accordance with claim 1, further comprising applying color sigma filtering to the image before the locating step.

6. A method in accordance with claim 1, wherein the locating step comprises gradient based perceived color discontinuity detection.

7. A method in accordance with claim 1, wherein the first color space image is RGB.

8. A method in accordance with claim 1, wherein the second image space is selected from CMYK, CMYKF, L*a*b*, or device color space.

9. A method in accordance with claim 1, further comprising editing the printer profile.

10. A method in accordance with claim 1, further comprising editing the image in the second image space.

11. A method in accordance with claim 1, further comprising scanning the image into the first color space image.

12. A method in accordance with claim 1, further comprising either changing the mapping curve shape, changing the printer profile, or editing the image to reduce printer perceived color discontinuity.

13. A printer comprising:
    a processor for printing a first color space image using a test target that has smoothly changing color, detecting a perceived color discontinuity in said first color space image; locating said perceived color discontinuity within said first color space image; and mapping the image into the second image space.

14. A printer in accordance with claim 13, wherein said first color space image is a hexagon.

15. A printer in accordance with claim 14, wherein the processor applies wavelet perceptual denoising to the image before locating the perceived color discontinuity.

16. A printer in accordance with claim 14, wherein the processor applies color sigma filtering to said first color space image before locating the perceived color discontinuity.

17. A printer in accordance with claim 14, wherein the processor applies gradient based perceived color discontinuity detection.

18. A printer in accordance with claim 14, wherein the first color space image is RGB.

19. A printer in accordance with claim 14, wherein the second image space is selected from CMYK, CMYKF, L*a*b*, or device color space.

20. A printer in accordance with claim 14, wherein the processor edits the printer profile.

21. A printer in accordance with claim 14, wherein the processor edits the image in the second image space.

22. A printer in accordance with claim 14, further comprising a scanner for scanning the image into the first color space image.

23. A printer in accordance with claim 14, wherein the processor changes the mapping curve shape, changes the printer profile, or edits the image to reduce printer perceived color discontinuity.

24. A printer in accordance with claim 14, wherein the processor determines whether the perceived color discontinuity exceeds a threshold gradient.

* * * * *